(12) United States Patent
Butt

(10) Patent No.: US 8,355,491 B1
(45) Date of Patent: Jan. 15, 2013

(54) INTELLIGENT DO NOT DISTURB RULE

(75) Inventor: David W. Butt, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1400 days.

(21) Appl. No.: 12/015,686

(22) Filed: Jan. 17, 2008

(51) Int. Cl.
*H04M 3/42* (2006.01)
(52) U.S. Cl. .......... 379/210.02; 379/208.01; 379/210.01
(58) Field of Classification Search ............. 379/201.01, 379/201.07, 207.02, 207.03, 208.01, 210.02, 379/210.01
See application file for complete search history.

(56) References Cited

U.S. PATENT DOCUMENTS

| | | | |
|---|---|---|---|
| 4,278,844 A * | 7/1981 | Jones | ............................ 379/157 |
| 2004/0018839 A1 | 1/2004 | Andric et al. | |
| 2006/0291641 A1 | 12/2006 | Barclay et al. | |
| 2007/0143422 A1 | 6/2007 | Cai | |
| 2007/0209067 A1 | 9/2007 | Fogel | |

FOREIGN PATENT DOCUMENTS

WO WO9842114 A1 9/1998

* cited by examiner

*Primary Examiner* — Antim Shah
(74) *Attorney, Agent, or Firm* — P. Su

(57) ABSTRACT

Methods and apparatus for allowing parties to temporarily and automatically bypass an established "do not disturb" (DND) are disclosed. According to one aspect of the present invention, a method includes applying a DND with respect to a telephone apparatus associated with a telephone number for a first party, and obtaining a first indication of a first new attempt by the first party to establish contact with a second party. The method also includes maintaining a second indication which indicates that a first attempted call from the second party to the telephone number is a response to the first new attempt. It is determined if the first attempted call from second party to establish contact with the first party occurs. If the first attempted call is made, the method includes routing the first attempted call from the second party to the telephone apparatus such that the DND is effectively bypassed.

20 Claims, 6 Drawing Sheets

INTELLIGENT DO NOT DISTURB RULE

BACKGROUND OF THE INVENTION

The present invention relates generally to communications systems.

Communications systems, as for example telephone systems, often provide a "do not disturb" (DND) feature that enables a user or owner of a telephone to effectively prevent incoming call attempts. In general, if a DND feature is active with respect to a particular telephone number, then when that telephone number is dialed by a person, e.g., a requester, wishing to contact the user, the requester will be routed to another destination, such as a voicemail system, or notified that the desired destination is effectively unavailable.

Often, a user, who does not wish to be distracted, may activate the DND feature to effectively reduce interruptions associated with a communications method. If such a user wishes to receive communications from particular callers or requesters when the DND feature is activated, the user may create one or more rules that allow particular callers to essentially circumvent the DND feature. By way of example, an exception list, or a "white list," could be created, or a password may be assigned that would allow particular requesters to bypass the DND feature.

BRIEF DESCRIPTION OF THE DRAWINGS

The invention will be readily understood by the following detailed description in conjunction with the accompanying drawings, wherein like reference numerals designate like structural elements, and in which.

DESCRIPTION OF EXAMPLE EMBODIMENTS

General Overview

Figure 1:
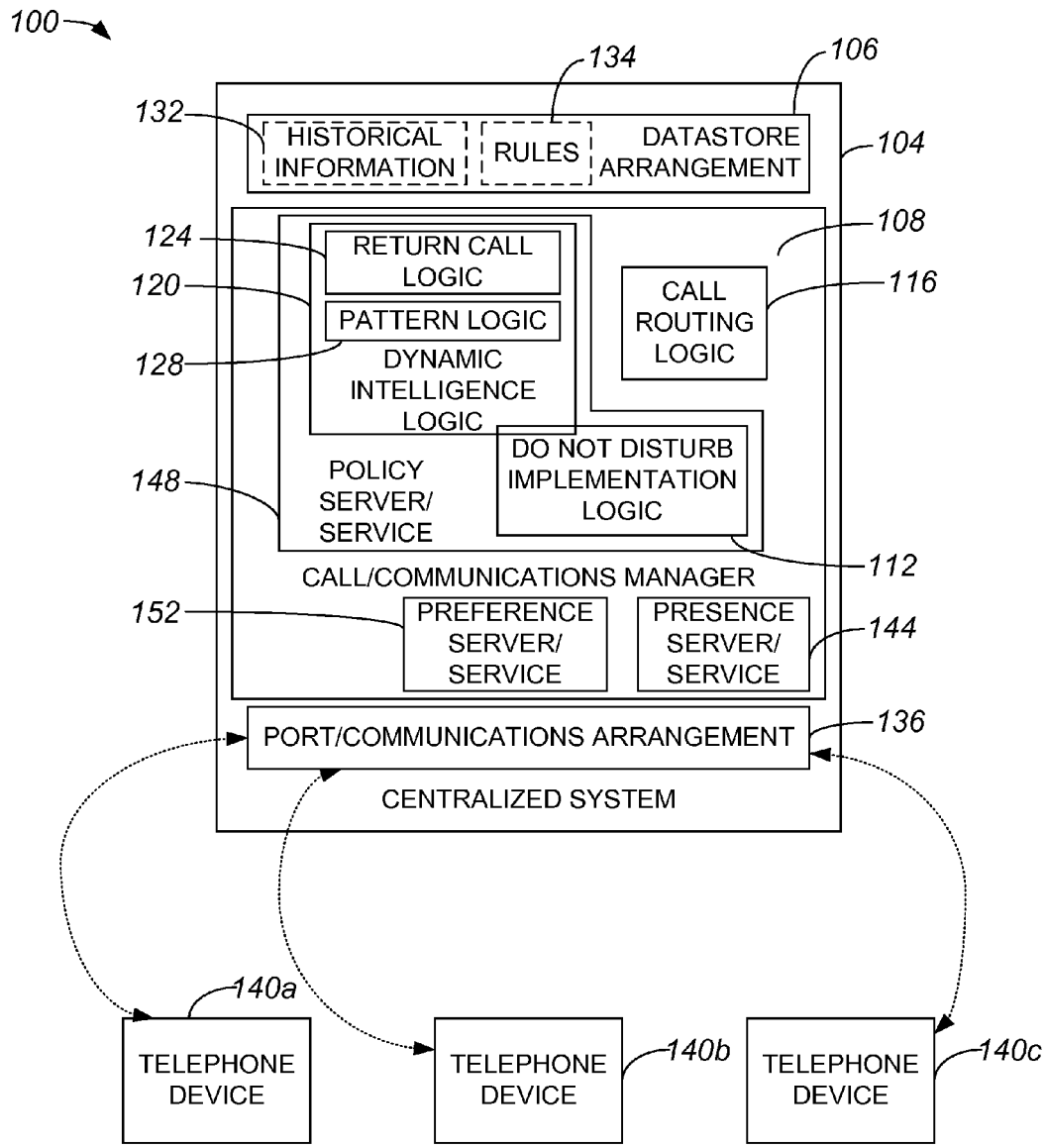
FIG. 1 is a block diagram representation of an overall communications system within which an intelligent "do not disturb" (DND) feature may be implemented in accordance with an embodiment of the present invention.

In one embodiment, a method includes activating a DND with respect to a user, applying the DND to a telephone apparatus associated with a telephone number for the user, and obtaining an indication of a new attempt by the user to initiate contact with a second party. The method also includes identifying an attempted call from the second party to the telephone number of the user, in response to the attempt made by the user. A determination is made as to when the first attempted call from second party to establish contact with user occurs, and when the first attempted call is made, the method includes routing the first attempted call from the second party to the telephone apparatus such that the DND is effectively bypassed.

DESCRIPTION

Allowing contact rules to be dynamically and/or temporarily set based on a communications history or behavior ensures that critical or important communications may be received even when a "do not disturb" (DND) feature is activated. In an example DND implementation, inbound communications or calls to a telephone number associated with a DND feature may be such that substantially all inbound communications are routed to message stores. Alternatively, in another example DND implementation, inbound communications associated with particular requesters are routed to message stores, while inbound communications associated with other requesters are allowed to bypass the DND process. Particular requesters allowed to bypass the DND process may be included in "white lists," while those requesters who are not allowed to bypass the DND process may be included in "black lists."

When contact rules, or the ability to bypass a DND, may be dynamically and/or temporarily set based on behaviors associated with a user or owner who has implemented the DND, the user may receive substantially only desired inbound communications without having to undergo a time consuming process of manually creating a temporary rule that allows the desired communications to bypass the DND. In other words, a temporary rule that allows a DND to be bypassed may be substantially automatically created based on the outcome of a user's behavior.

Using recent historical behavior to automatically set routing rules for inbound communications enables a DND to be intelligently implemented. The intelligent implementation may include, but is not limited to including, elevating a "priority level" associated with particular requesters based on communications patterns between the particular requester and a user who has a telephone with DND capabilities. A user is generally a first party or an owner of DND, while a requester is generally a second party who is allowed to substantially bypass a DND. When a requester has a relatively high priority level with respect to the ability to communicate with a user, inbound communications from the requester may bypass a DND set or activated by the user. A relatively high priority level may be associated with, among other things, frequent communications and/or recent communications.

The ability of an individual to get around or effectively bypass a DND may be based upon activities of the "owner" of a communications address, e.g., a telephone number or e-mail address, on which a DND has been activated. By way of example, an individual A, who owns a telephone number may activate a DND feature with respect to his telephone number on his telephone, and then attempt to contact an individual B. If individual B is unavailable, then individual A may leave a message for individual B asking that individual B return the call. The overall communications system may record that individual A initiated a communication to individual B. The overall system may then effectively assign an elevated priority level to individual B, such that a telephone call from individual B to individual A may be allowed to bypass an activated DND. It should be appreciated that this system does not require that individual B use the same device or media type used by individual A to return the communication. By way of example, individual A may send a communication that is an instant message to individual B, and individual B may effectively return the communication by placing a telephone call to individual A. It should also be appreciated that once individual B has successfully initiated a telephone call to individual A, the elevated priority level assigned to individual B may be retracted, thereby impacting whether individual B may be able to bypass the DND in the future.

As previously mentioned, a DND may also be bypassed by requester(s) based on historical data, e.g., recent historical data. In one embodiment, if historical data indicates that communications have recently and frequently occurred between two individuals, namely individual A and individual B, substantially immediately prior to individual A activating a DND feature on his or her telephone, individual B may be temporarily promoted such that any incoming telephone call from individual B to individual A may be allowed to bypass the DND. After a period of inactivity such as a lack of communications between individual A and individual B, individual B may effectively lose his or her temporary promotion. Once the temporary promotion is lost, individual B may be rendered unable to bypass the DND.

Traditionally, DND features have been implemented for particular communications systems, e.g., telephony or instant messaging systems, and are applied only to specific addresses in that system, and only to that system. In one embodiment, DND features may be substantially oriented to be implemented to apply to effectively any communications system independent of a communications address, e.g., a telephone number, to apply to multiple communications systems which use the same core, e.g., telephone system and an instant messaging system, and to apply across communications systems such that actions taken on one system may potentially impact requester access in another system.

Referring initially to FIG. 1, an overall communications system within which an intelligent DND feature may be implemented will be described in accordance with an embodiment of the present invention. An overall communications system 100 includes a centralized system 104 and communications devices such as telephone devices 140a-c which each have at least one associated telephone number or substantially unique address. Centralized system 104 may be a singular purpose communications system, such as a voice over Internet protocol (VoIP) system, or may be a multi-protocol, multi-media, general purpose or "unified" communications system. Centralized system 104 includes a port or communications arrangement 136, a communications manager 108, and a datastore arrangement 106.

Port arrangement 136 is provided to enable centralized system 104 to communicate with communications devices 140a-c. When devices 140a-c are used to initiate communications, for instance to place a telephone call or to send an instant message, a communications session is connected to centralized system 104 through port arrangement 136. In addition, port arrangement 136 provides an interface that enables communications manager 108 to identify when devices 140a-c are associated with DNDs, and to monitor devices 140a-c.

Communications manager 108 generally includes hardware and/or software logic embodied in tangible media. When executed, the logic is arranged to implement an intelligent DND. DND implementation logic 112 is typically arranged today to implement a DND with respect to a specific device or devices 140a-c as part of centralized system 104. That is, DND implementation logic 112 is arranged to provide a filtering mechanism that reduces inbound communications and, hence, interruptions that are received by those devices. DND implementation logic 112 provides functionality that allows policy server/service 148 to effectively block the completion of communications attempts that are inbound to appropriate devices 140a-c.

Policy server/service 148 may also be arranged to associate the ability to bypass a DND with user entities independent of devices 140a-c. That is, policy server/service 148 may be arranged to identify a requester who possesses a device 140a-c, and to identify substantially all addresses and phone numbers associated with the requester. In this case, DND implementation logic 112 may allow policy server/service 148 to identify incoming requests for communications with a requestor and not a specific device 140a-c, and then to block the incoming requests as appropriate based on the identity of the requester.

DND implementation logic 112 is arranged to cooperate with communications routing logic 116 and dynamic intelligence logic 120. Communications routing logic 116 is arranged to identify a device 140a-c that is suitable for receiving communications, e.g., a telephone call, and to route the communications appropriately. If, for example, a DND is implemented with respect to a device 140a-c, to which communications are intended, and the communications do not have a priority level that enables the DND to be bypassed, when notified of that fact, communications routing logic 116 may route the communications to appropriate message stores (not shown) such as voice mailboxes. Dynamic intelligence logic 120 includes return call logic 124 and pattern logic 128. In general, dynamic intelligence logic 120 is arranged to cooperate with DND implementation logic 112 to enable certain inbound communications to bypass an activated DND as enforced as part of the policy server/service 148.

Return call logic 124 includes functionality that enables certain attempts at contact to be processed as responses to previous contacts, or as return calls. By way of example, if a telephone device 140a is used in an initial attempt to contact telephone device 140b, and then telephone device 140a has an activated DND, a subsequent attempt by telephone device 140b to establish contact with telephone device 140a may be processed as a response to the initial attempt rather than a new attempt. A response or return call may be processed by call routing logic 116 as having a priority that enables the response or return call to bypass, or otherwise circumvent, a DND. It should be appreciated that this would also be the case when DND is applied at a user level. In this case, the recording of an initiation and a response may be related to the identity of a user. As a result, the recording is typically independent of a media type or a device. For example, a user may try to contact a requester via telephony, and the requester may attempt to respond via instant messaging. In one embodiment, although the user may have set a DND applicable across all media and devices, the priority created by return call logic 124 enables the connection between the user and the requestor to be completed.

Pattern logic 128 is arranged to identify patterns of communications between users or devices 140a-c, and to alter priority levels that are associated with user interaction, or devices 140a-c, accordingly. For example, if device 140a and device 140b have recently communicated frequently, pattern logic 128 may temporarily elevate the priority level of device 140b with respect to an ability to bypass a DND on device 140a. Historical information 132, which is stored in datastore arrangement 106, may include a log of all communications managed or otherwise processed by communications manager 108, as well as priority levels of users, or devices 140a-c. Hence, pattern logic 128 may access historical information 132 to identify patterns of communications.

Dynamic intelligence logic 120 may automatically set rules 134 which may be used to identify inbound communications which may bypass DNDs. In one embodiment, rules 134 are arranged to effectively identify which users, or devices 140a-c, have priority to bypass DNDs to other users or other devices 140a-c. Such rules 134 may be stored in datastore arrangement 106 such that communications manager 108 and policy services 148 may access and implement rules, using DND logic 112. It should be appreciated that rules 134 may be temporary, and may be updated.

Centralized system 104 include policy server/service 148, and may also include a presence server/service 144 and a preference server/service 152. Presence service 144 is configured to provide in use state information for devices 140a-c, as well as to provide the relationship information associating specific users with specific devices, whether temporarily or permanent assignments, to all for the applicability of policy, DND, or routing logic on a user basis. Policy server/service 148 is configured to implement policies that may be used by communications manager 108 to route calls. By way of example, policy server/service 148 may specify how frequently communications between two parties are to occur in order for one of the parties to be considered to have an elevated priority with respect to communicating with the other party. A preference server/service 152 is configured to provide user initiated preferences in regards to specific policies, routing rules, or other logic to be applied to a user's communications behavior that are specific to the user, as opposed to corporate governance or architectural mandate, for instance. For example, the construction of a list or a "white list" of individuals or devices 140a-c which a user always wants to be available for is unique to that user. Further, the decision to take advantage of intelligent DND logic 112 or not may be constructed and identified by the user via preference server/service 152.

Figure 2:
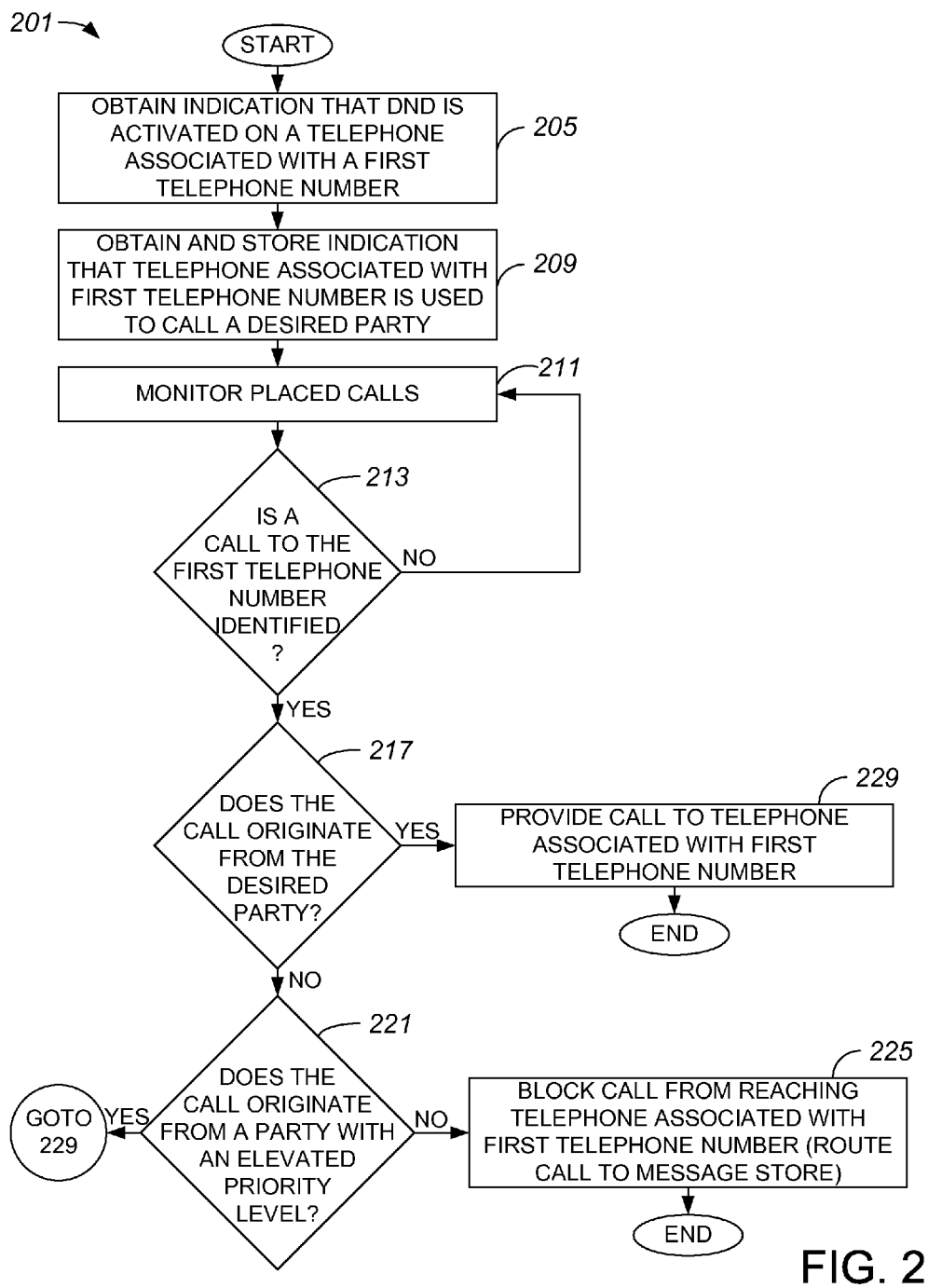
FIG. 2 is a process flow diagram which illustrates an overall method of maintaining a DND status for a user using a centralized system, e.g., a policy manager, in accordance with an embodiment of the present invention.

FIG. 2 is a process flow diagram which illustrates an overall method of maintaining a DND status for a phone number using a centralized system, e.g., a communications manager, in accordance with an embodiment of the present invention. A method 201 of maintaining a DND status from the point-of-view of a communications manager begins at step 205 in which an indication is obtained that a DND has been activated for a telephone associated with a first telephone number. In one embodiment, when a DND is activated for a telephone in a network associated with the communications manager, the telephone sends a notification to the call manager.

Once the indication of a DND is obtained, the communications manager obtains and stores an indication that the telephone associated with the first telephone number is used to call a desired party in step 209. That is, the communications manager is effectively notified that a user of the telephone on which the DND is active, namely user A, has placed a call to a desired party, user B. The indication may be stored as a temporarily raised priority level for user B. In general, the call to the desired party may be made to any telephone number which is identified with, or otherwise owned by, the desired party. Although an indication of any call to the desired party may be obtained and stored, it should be appreciated that in one embodiment, an indication may substantially only be obtained and stored for a call that results in a message being left on a message stores associated with the desired party, although this need not be a requirement.

In step 211, the communications manager monitors placed calls or, more generally, inbound communications that are intended for parties associated with the communications manager, e.g., telephone numbers managed or otherwise serviced by the communications manager. A determination is made in step 213 as to whether an attempt to call to the telephone number of user A has been identified in the course of monitoring placed calls. If it is determined that there has been no attempted call to the first telephone number, process flow returns to step 211 in which the call manager continues to monitor placed calls.

Alternatively, if it is determined in step 213 that an attempted communication to the telephone number of user A has been identified, it is determined in step 217 whether the attempted communication originated from user B. For ease of discussion, although there may be multiple desired parties, i.e., parties the telephone associated with the first telephone number has been used in an attempt to establish contact, only a single desired party is described. If it is determined that the attempted communication originated from user B, the implication is that there is a temporary rule which specifies that the call is allowed to bypass the DND and, hence, be "put through" to the telephone associated with user A, because user B has an elevated priority level. In one embodiment, the attempt by user A to call user B described in step 209 is considered to be an attempt at communication, and the call that originated from user B is considered to be a response to the attempt at communication. If the call is determined to originate from user B, process flow moves from step 217 to step 229 in which the call is provided to the telephone associated with user A. The method of maintaining a DND status is completed upon providing the call to the telephone associated with the first telephone number.

Returning to step 217, if the determination is that that the attempted call did not originate from user B, then it is determined in step 221 if the attempted call originated from a different party with an elevated priority level. Parties with an elevated priority level may include, but are not limited to including, parties which have an assigned high priority level, parties to whom passwords for bypassing a DND have been provided, and parties with whom user A has previously attempted to communicate. In one embodiment, parties with an elevated priority level include parties for which temporary rules have been implemented.

If it is determined in step 221 that the attempted call originated from a party with an elevated priority level, process flow moves to step 229 in which the attempted call is provided to the telephone associated with user A. Alternatively, if the determination is that the attempted call did not originated from a party with an elevated priority level, the attempted call is blocked in step 225 from reaching the telephone associated with user A. That is, the attempted call is effectively blocked by the DND, and may be routed to a message store, e.g., voice mail or an answering service, associated with the first telephone number.

Figure 3:
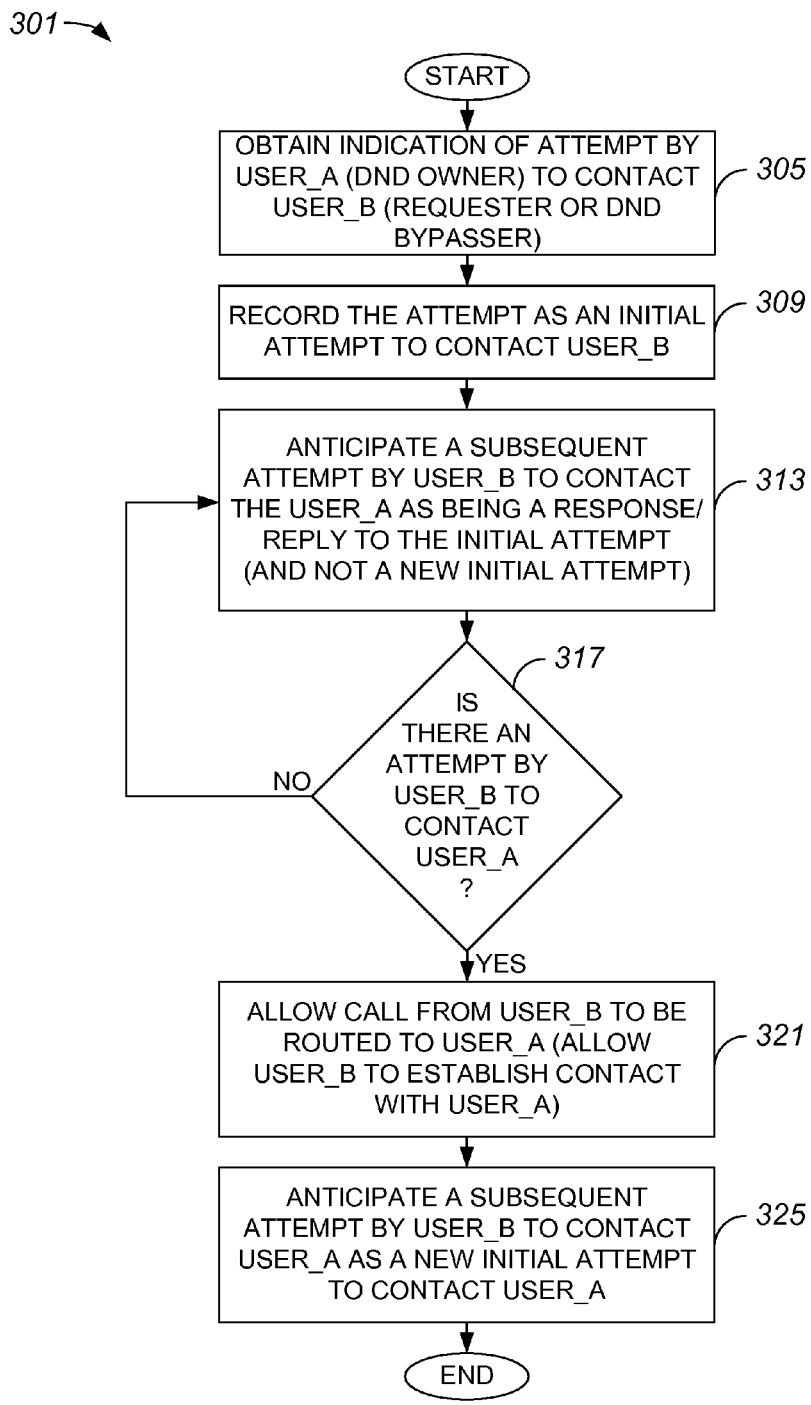
FIG. 3 is a process flow diagram which illustrates a method of processing attempted communications between two parties in which one party has a DND activated in accordance with an embodiment of the present invention.

As previously mentioned, an attempt by user A to contact user B may be considered to be an initial attempt at contact, and a subsequent attempt by user B to contact user A may be considered to be a response to the initial attempt at contact. With reference to FIG. 3, a method of processing attempted communications between user A and user B in which user A initiates contact, and user B subsequently responds, will be described from the point of view of a communications manager in accordance with an embodiment of the present invention. A method 301 of processing attempted communications begins at step 305 in which a communications manager obtains an indication of an attempt by a first party, namely user A, to contact a second party, namely user B. The attempt at contact may be an unsuccessful attempt in that user A fails to establish contact with user B, and may leave a message for user B.

Typically, the attempt by user A to contact user B may be initiated from a telephone device and, hence, a first telephone number of user A with respect to which the DND is associated. It should be appreciated, however, that the attempt by user A to contact user B may be initiated from a second telephone number with which user A is associated. For instance, user A may have a DND set on his/her office phone, but may attempt to contact user B using his/her mobile phone. The communications manager may be configured to recognize that a response from user B may be made by calling the first telephone number, i.e., the telephone number on which the DND is activated, even though the initial attempt was made from the second telephone number. Further, the attempt by the user A to contact user B is not limited to being associated with a telephone call. By way of example, the attempt may be associated with sending an e-mail, sending an instant message, or sending a page. User B may respond to substantially any of these attempts by calling the first telephone number and, further, bypassing the DND associated with the first telephone number.

Once an indication of attempt by user A to contact user B is obtained by the communications manager, the communications manager records the attempt as an initial attempt to contact user B in step 309. If the attempt is an unsuccessful attempt, the attempt may effectively be considered to be an invitation from the user A to user B, or a request to communicate sent by user A to user B. After the initial attempt to contact user B is recorded, the communications manager anticipates any future attempt by the user B to establish contact with user A as being a response or a reply to the initial attempt in step 313. That is, a response from user B to the attempt at contact initiated by user A is anticipated. As such, any future attempt by user B to contact user A may be considered to be a response, and not a new initial attempt. Anticipating a future attempt may include effectively automatically creating a temporary rule in the communications manager. Such a temporary rule may specify that the next attempt by user B to establish contact with user A may bypass a DND.

A determination is made in step 317 as to whether there is an attempt by user B to contact user A. That is, it is determined if there is a response from user B to the attempted contact that was initiated by user A. In one embodiment, the attempt is made by dialing the telephone number on which user A has activated a DND. If the determination is that there has not been an attempt by user B to contact user A, process flow returns to step 313 in which a future attempt by user B to contact user A is anticipated as being a response to the attempt initiated by user A.

Alternatively, if it is determined in step 317 that there has been an attempt by user B to contact user A, the implication is that user B has responded to the attempt by user A to contact user B. Such a response may involve calling a telephone number with an active DND that is associated with user A. Accordingly, in step 321, user B is allowed to effectively bypass the DND that is activated with respect to the telephone number of user A. Bypassing the DND generally includes allowing the telephone call from user B to be routed to user A and, hence, allowing user B to establish contact with user A. As will be appreciated by those skilled in the art, establishing contact with the first party may include allowing the telephone call from the second party to be put through to the telephone of the first party, e.g., such that user A and user B may speak to each other.

An initial attempt by user A to contact user B may be made by calling user B at a first communications address, e.g., a first telephone number, associated with user B. The communications manager may be configured to recognize that a response from user B to that initial attempt may be initiated from substantially any telephone number associated with user B. Hence, a call from any telephone number identified or associated with user B to the first telephone number of user A, i.e., the telephone number on which the DND is activated by user A, may bypass the DND. Further, the response is not limited to being associated with a telephone call. By way of example, the response may be associated with sending an e-mail, sending an instant message, or sending a page to user A.

From step 321, process flow moves to step 325 in which the communications manager anticipates a subsequent attempt by user B to contact user A, e.g., to dial a telephone number associated with user A, as a new initial attempt to contact user A, assuming that the previous attempt has been successful. In other words, after user B has successfully connected with user A in response to the attempt to contact that was initialized by user A, any subsequent attempt by user B to contact user A is considered to be a new initial attempt at contact. The processing of attempted communications is completed once step 325 is executed.

As described above, an intelligent DND system may effectively recognize when user A, i.e., a first party, initiates contact with user B, i.e., a second party. When user A invokes DND, either before or after the attempt, the intelligent DND system may identify such attempts as a reason for temporarily elevating the priority level of user B. Temporarily elevating the priority level enables a call or, more generally, a communication, from user B to user A to be processed as a response to the contact initiated by user A, and not as an initial attempt at contacting user A. Hence, the response to the contact initiated by user A may be routed to user A such that a DND is effectively bypassed.

Figure 4:
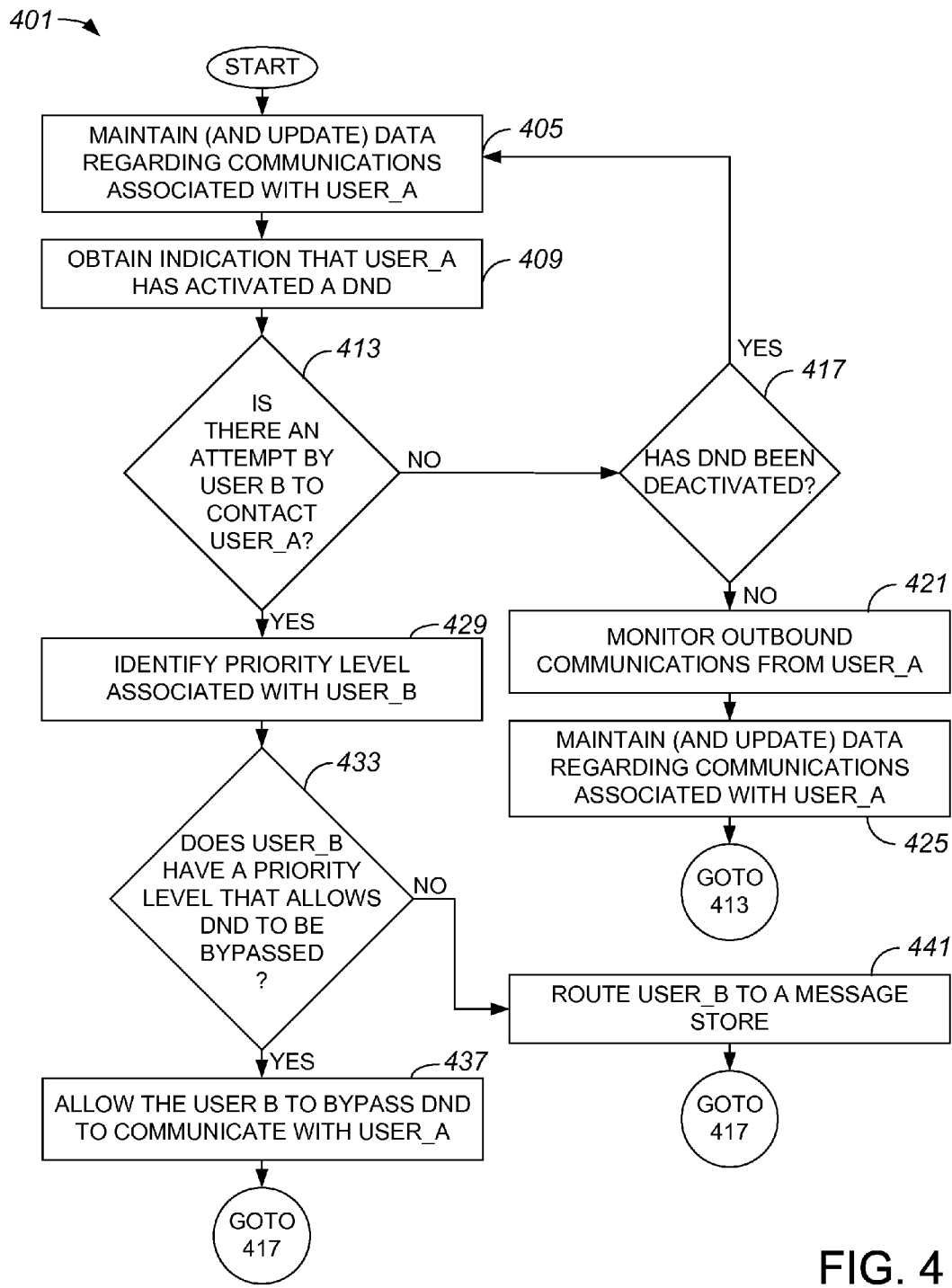
FIG. 4 is a process flow diagram which illustrates a method of processing attempted communications using a system in which historical data is used to ascertain whether a requester may circumvent a DND status associated with a User in accordance with an embodiment of the present invention.

In one embodiment, an intelligent DND system may account for historical contact data when determining whether a particular party may bypass a DND. By way of example, if user A and user B have been in communication both relatively frequently and relatively recently, a temporary rule may be set that allows a communication from user B to user A to be routed to user A, even if the device or user A has an associated active DND. FIG. 4 is a process flow diagram which illustrates a method of processing attempted communications using a system in which historical data is used to ascertain whether user B may circumvent a DND status associated with user A in accordance with an embodiment of the present invention. A method 401 of processing attempted communications that includes utilizing historical data begins at step 405 in which a communications manager maintains data regarding communications associated with user A. Maintaining the data may include obtaining information associated with communications that involve user A, and storing the information, e.g., in a datastore.

In step 409, the communications manager obtains an indication that the user A has activated a DND. Such an indication may be obtained when user A contacts the communications manager to activate the DND, or otherwise informs the communications manager that a DND is activated or to be activated. As previously mentioned, the DND is activated either for a device that is associated with or owned by, or otherwise assigned to, user A, or for user A themselves, and thus is propagated to all forms of communication attempts with the user in any media, form, or through any device associated with user A. Once the indication has been obtained, it is determined in step 413 whether there has been an attempt by user B to contact user A, e.g., by calling the telephone number associated with user A.

If the determination in step 413 is that there has been no attempt by user B to contact user A, it is then determined in step 417 whether the DND associated with the telephone number has been deactivated or otherwise terminated. If it is determined that the DND has been deactivated, process flow returns to step 405 and the maintenance of data regarding communications associated with the first party.

Alternatively, if it is determined that the DND has not been deactivated, the communications manager monitors outbound communications from user A in step 421. It should be appreciated that while a DND is activated with respect to devices associated with user A, user A may still effectively initiate contact with other parties. In step 425, the communications manager maintains data regarding communications associated with user A. From step 425, process flow returns to step 413 and a determination of whether there has been an attempt by user B to contact user A, i.e., whether there are inbound communications from user B that are intended for user A.

If it is determined in step 413 that there is an attempt by user B to contact user A, a priority level associated with user B is identified in step 429. In one embodiment, the priority level of user B, as defined with respect to contacting user A, may be stored in a datastore that is accessible to the communications manager. The priority level is arranged to provide an indication of whether user B is allowed to bypass a DND established by user A.

After the priority level is identified, a determination is made in step 433 as to whether user B has a priority level that allows the DND associated with user A to be bypassed. In general, a priority level that is above a particular threshold level may be considered to be sufficient to allow user B too essentially to bypass the DND logic. A priority level may be raised or elevated from a baseline, or default, priority level if, for example, communications between user B and user A are recent and/or frequent, or if the attempted contact is a response to an earlier contact initiated by user A.

If it is determined in step 433 that user B has a priority level that allows it to bypass a DND associated with user A, user B is then allowed to bypass the DND in step 437 such that user B may communicate with user A. Once user B bypasses the DND to communicate with user A, process flow moves to step 417 in which it is determined whether the DND has been deactivated.

Alternatively, if it is determined in step 433 that user B does not have a priority level that is sufficient to allow a DND associated with user A to be bypassed, the indication is that a call attempted by user B is to be blocked by the DND. As such, in step 441, user B may be routed to a message store. In other words, the inbound communications provided by user B may be routed by the communications manager to an appropriate message store, e.g., a voice mail box or an answering service. From step 441, process flow returns to step 417 in which it is determined whether the DND has been deactivated.

Figure 5:
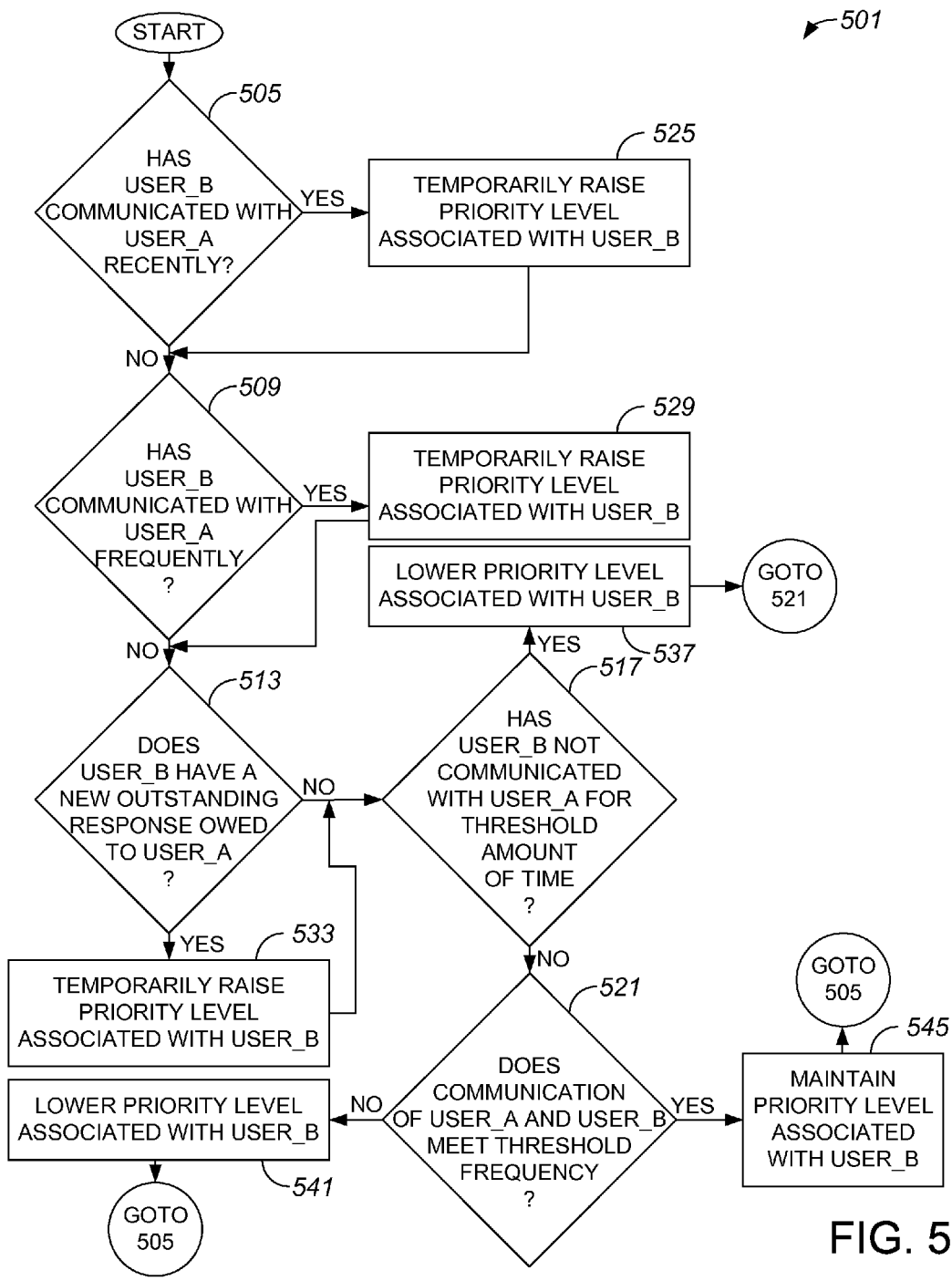
FIG. 5 is a process flow diagram which illustrates a method of temporarily promoting or demoting a particular requester with respect to the ability of the requester to circumvent a DND status associated with a user in accordance with an embodiment of the present invention.

As mentioned above, the priority level associated with an individual or party may be temporarily elevated or lowered based on a history of communications. A priority level may be used to determine whether a particular individual or party, user B, has permission to bypass a DND. FIG. 5 is a process flow diagram which illustrates a method of temporarily promoting or demoting user B with respect to the ability of user B to circumvent a DND status associated with a device or user in accordance with an embodiment of the present invention. A process 501 of altering a priority level of user B with respect to an ability to bypass a DND associated with user A begins at step 505 in which it is determined if user B has communicated with user A recently. Recent communications may be defined to be communications that have occurred within a particular time frame. It should be appreciated that the definition of recent communications may vary widely depending, for example, upon the requirements of a particular communications system, user, or corporate policy as enforced by the policy service. In one embodiment, the determination of whether user B has recently communicated with user A may involve determining if user A and user B have successfully communicated. As unsuccessful attempts by user B to communicate with user A may be due to a lack of desire by user A to receive communications from user B, unsuccessful attempts may be eliminated from being counted as recent communications.

If it is determined that user A and user B have recently communicated, the priority level of user B is temporarily raised in step 525. The priority level may be raised by a particular amount, or may be raised to a predefined level. For example, if priority levels are based on a scale, the priority level may be incrementally increased depending upon how recent user B has communicated with user A. Alternatively, if priority levels have predefined levels, a priority level may be raised to the next predefined level, e.g., from a "regular" priority level to an "elevated" or "high" priority level. It should be appreciated that if the priority level associated with user B is already at a substantially highest possible level, the priority level may not actually be raised in step 525 but may, instead, be maintained at the substantially highest possible level.

Once the priority level is temporarily raised in step 525, or if it is determined in step 505 that user B has not recently communicated with user A, process flow proceeds to step 509 in which it is determined whether user B has communicated with user A frequently. A threshold amount for what is defined as frequent communications may vary widely. By way of example, a particular number of communications within a predefined time frame may be used as a threshold when determining whether communications are frequent. In one embodiment, frequent communications may include substantially only frequent successful communications, and not unsuccessful attempts at communications.

If it is determined that user B and user A have communicated frequently, the priority level of user B is temporarily raised in step 529. After the priority level is temporarily raised, or if it is determined in step 509 that user B has not frequently communicated with user A, process flow moves to step 513 and a determination of whether user B owes a response to user A, i.e., a response that has not previously resulted in a temporarily raised priority level. That is, step 513 is a determination of whether a subsequent attempt by user B to contact user A is considered to be a response to a previous attempt by user A to contact user B.

In the described embodiment, if it is determined that user B owes a response to user A, the priority level associated with user B is temporarily raised in step 533. Typically, the priority level may be raised to a level that will allow an attempt to communicate from user B to user A to bypass a DND established with respect to the user A. Once the priority level is temporarily raised in step 533, or if it is determined in step 513 that user B does not owe a response to user A, process flow proceeds to step 517 in which it is determined whether user B has failed to communicate with user A for a particular amount of time, e.g., a threshold amount of time.

If the determination in step 517 is that user B and user A have not communicated for a threshold amount of time, the priority level associated with user B is lowered in step 537. The amount by which the priority level is lowered may vary. Upon lowering the priority level, or if it is determined in step 517 that user B has not communicated with user A for the threshold amount of time, a determination is made in step 521 regarding whether communications between user A and user B meet a threshold frequency, or a substantially minimum level of frequency. In other words, it is determined in step 521 whether communications between user A and user B are considered to be relatively infrequent. If the communications between user A and user B do not meet the threshold frequency, the priority level of user B is lowered in step 541. Then, process flow returns to step 505 in which it is determined if user B has communicated with user A recently.

Alternatively, if it is determined in step 521 that communications between user A and user B meet the threshold frequency, the implication is that the current priority level of user B is accurate. Accordingly, in step 545, the priority level of user B is maintained, and process flow returns to step 505 and the determination of whether user B has recently communicated with user A.

Figure 6:
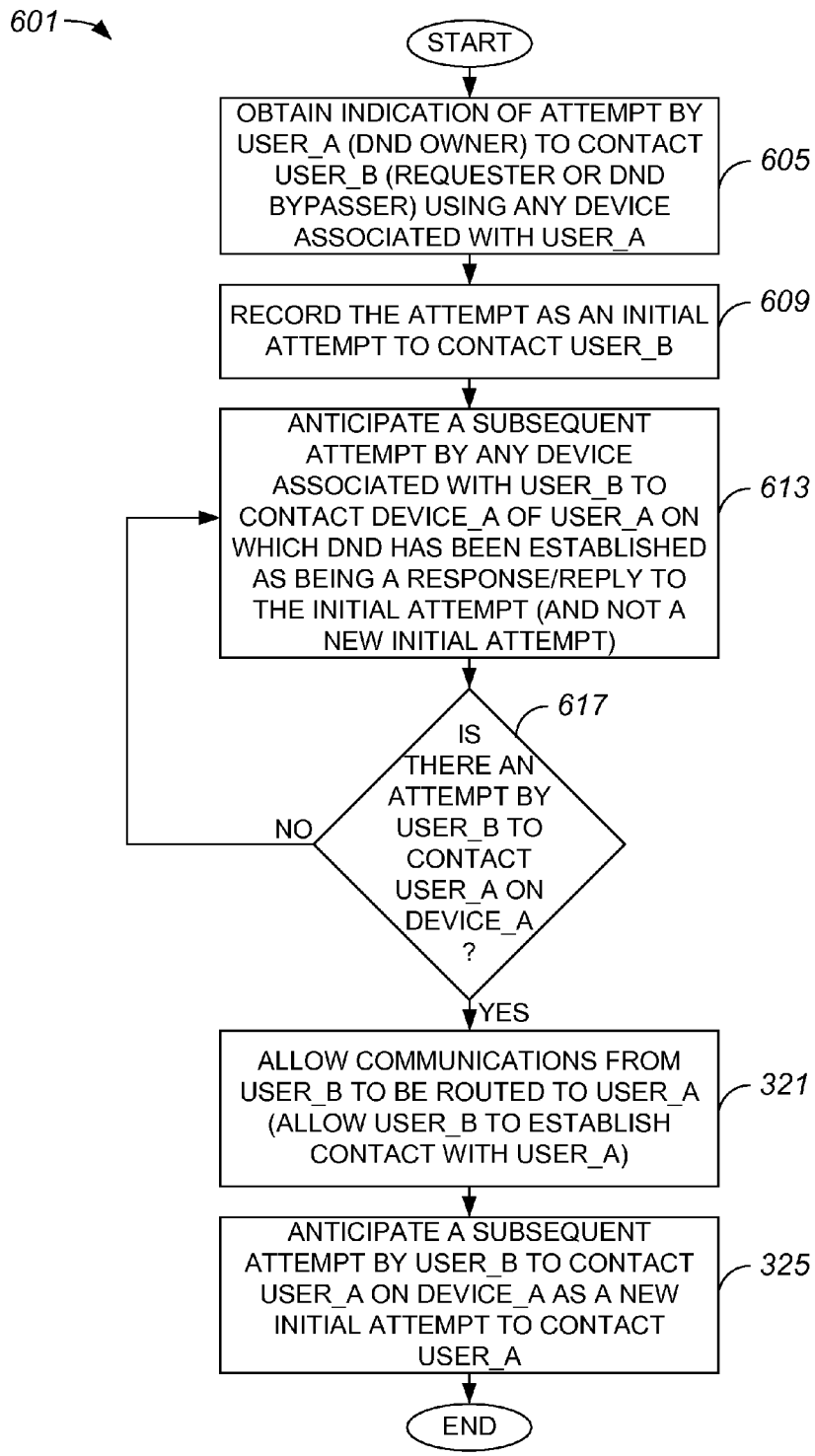
FIG. 6 is a process flow diagram which illustrates a method of processing attempted communications between two parties which each have multiple device types associated therewith, and one party has a DND activated in accordance with an embodiment of the present invention.

As previously mentioned, user A and user B may each have multiple associated devices and/or device types. A communications manager may generally be arranged to identify user B as being associated with multiple addresses and telephone numbers. Hence, when user B uses any of the multiple addresses or telephone numbers to respond to a communications attempt by user A, the communications manager may determine that a DND set by user A may be bypassed by user B in general. FIG. 6 is a process flow diagram which illustrates a method of processing attempted communications between user A and user B when each have multiple device types associated therewith, and user A has a DND activated in accordance with an embodiment of the present invention. A method 601 of processing attempted communications begins at step 605 in which a communications manager obtains an indication of an attempt by a user A to contact user B using substantially any device associated with user A. By way of example, user A may leave user B a voice mail message, user A may attempt to initiate instant messaging communications with user B, and/or user A may send user B an e-mail.

Once an indication of attempt by user A to contact user B is obtained by the communications manager, the communications manager records the attempt as an initial attempt to contact user B in step 609. After the initial attempt to contact user B is recorded, the communications manager anticipates any future attempt by the user B to establish contact with user A as being a response or a reply to the initial attempt in step 613. It should be appreciated that the future attempt by user B to establish contact may be accomplished using a different communications type than the initial attempt. For example, user B may attempt to place a telephone call to user A in response to an e-mail sent by user A. Anticipating a future attempt may include effectively automatically creating a temporary rule in the communications manager. The temporary rule may specify that the next attempt by user B to establish contact with user A may bypass a DND or the like set by user A with respect to a telephony system, an instant messaging system, or an e-mail system.

A determination is made in step 617 as to whether there is an attempt by user B to contact user A using a communications type on which user A has established a DND or the like. By way of example, if user A has a DND set with respect to a first telephone number, the determination in step 617 may be whether user B has attempted to call the first telephone number.

If the determination is that there has not been an attempt by user B to contact user A using a communications type on which user A has established a DND or the like, process flow returns to step 613 in which a future attempt by user B to contact user A is anticipated as being a response to the attempt initiated by user A. Alternatively, if it is determined in step 617 that there has been an attempt by user B to contact user A, the implication is that user B has responded to the attempt by user A to contact user B using a communications type on which user A has established a DND. As user B is responding to a communications attempt by user A, user B is allowed to effectively bypass the DND established by user A in step 621.

Once user B bypasses the DND, process flow moves to step 625 in which the communications manager anticipates a subsequent attempt by user B to contact user A as a new initial attempt to contact user A, assuming that the previous attempt has been successful. That is, after user B has successfully connected with user A in response to the attempt to contact that was initialized by user A, any subsequent attempt by user B to contact user A is considered to be a new initial attempt at contact. The processing of attempted communications is completed once step 625 is executed.

Although only a few embodiments of the present invention have been described, it should be understood that the present invention may be embodied in many other specific forms without departing from the spirit or the scope of the present invention. By way of example, while a particular communications device, such as a telephone, is associated with a particular communications address, i.e., telephone number, has been described as being used to ascertain a frequency and pattern of communications with a particular party, the user associated with the telephone themselves may instead be used to ascertain the frequency and pattern of communications. That is, when assessing whether a priority level for user B is to be elevated with respect to user A, communications accomplished using multiple phone numbers associated with both user A and user B may be used. More generally, in lieu of tracking communications associated with a particular device or address, e.g., a telephone number, substantially all communications associated with a user may be tracked to identify parties for whom a priority level may be temporarily elevated. The communications may include, but are not limited to including, instant messages, e-mails, telephone calls, and video conferencing calls.

The outbound communication type associated with an initial attempt by user A to contact user B may be different from an inbound communication type associated with a response to the initial attempt. In other words, different media types may be associated with outbound communications and inbound communications, i.e., inbound communications that are considered to be responses to attempted outbound communications. For instance, user A may send an e-mail to user B, and user B may respond to the e-mail by dialing a telephone number of user A and be allowed to bypass a DND established with respect to the telephone number. Alternatively, user A may place a call to user B from a first telephone number such as a cell phone, and user B may respond to a second telephone number such as an office desk phone.

Dynamic intelligence logic of a communications manager may be configured to provide functionality that enables an initial attempt at communication made using a first medium to anticipate responses to the initial attempt made using a second medium. The dynamic intelligence logic may obtain information relating to multiple types of contact information associated with a first party such as user A and multiple types of contact information associated with a second party such as user B, e.g., telephone numbers and e-mail addresses. Hence, when user A makes an initial attempt to contact user B, the dynamic intelligence logic may anticipate a response by user B to any telephone numbers associated with user A as being suitable for bypassing DNDs activated with respect to those telephone numbers.

Attempts to by a requestor to communicate with a user are not limited to being initiated by humans. Requesters may, in one embodiment, be automated devices, applications, processes, or substantially any other entity that desires to communicate with a user via. In addition, users may also extend beyond individuals, and may include devices, applications, or processes which use communications methods for interaction.

In general, the present invention described a system in which exceptions to general rules may be dynamically and/or temporarily modified based on a pattern of behavior. It should be appreciated that the present invention is not limited to being associated with DND implementations and the like. By way of example, exceptions to general rules may be associated with social network systems, routing systems that are based on locations, and calendaring systems. With respect to social network systems, a communications manager may be arranged not to accept communications from requestors who are not part of the social network of a user. For instance, if a requestor is not in a user's call history or a contact list, the requestor may be prevented from contacting the user. With respect to routing systems, a communications manager may set exceptions to general rules based on a current location of a user. For instance, if a user with a mobile phone has entered a secure area, the communications manager may route calls to the user to voice mail until such time as the user has left the secure area. With respect to calendaring systems, a communications manager may determine which requestors may contact a user during certain times of the day. For instance, when a calendaring system indicates that a user is in a meeting, the communications manager may route communications from requestors to voice mail, while when the calendaring system indicates that a user is not in a meeting, the communications manager may route communications from requestors to the user.

The steps associated with the methods of the present invention may vary widely. Steps may be added, removed, altered, combined, and reordered without departing from the spirit of the scope of the present invention. By way of example, a method of processing attempted communications may include steps associated with determining whether a DND has been deactivated. Therefore, the present examples are to be considered as illustrative and not restrictive, and the invention is not to be limited to the details given herein, but may be modified within the scope of the appended claims.

What is claimed is:

1. A method comprising:
   activating a do-not-disturb (DND) associated with a first party, wherein activating the DND includes applying the DND with respect to a first communications device associated with a first party, the DND being arranged to prevent communications from being routed to the first communications device within a communications network;
   obtaining a first indication of a new attempt by the first party to establish contact with a second party, wherein the new attempt by the first party to establish contact with the second party is made using a second communications device associated with the first party, the second communications device being separate from the first communications device, and wherein the second party is aware that the first communications device and the second communications device are both associated with the first party, and wherein an association between the first communications device, the second communications device, and the first party is known to a communications manager within the communications network;
   maintaining a second indication, the second indication being arranged to indicate that a first attempted communication from the second party is a response to the new attempt by the first party to establish contact with the second party;
   determining when the second party attempts to establish contact with the first party on the first communications device by making the first attempted communication; and
   routing the first attempted communication from the second party to the first communications device, wherein routing the first attempted communication from the second party to the first party bypasses the DND.

2. The method of claim 1 further including:
   updating the second indication to indicate that a second attempted communication from the second party to the first communications device is not the response to the new attempt and is not to be routed to the first communications device, wherein updating the second indication occurs after the first attempted communication is routed from the second party to the first communications device.

3. The method of claim 1 wherein the first new attempt by the first party is an initial call placed using the first communications device and the first indication is obtained after activating the DND.

4. The method of claim 1 wherein the second indication is a temporary rule that is further arranged to indicate that the first attempted communication may bypass the DND.

5. Logic encoded in one or more non-transitory media for execution and when executed by a processor operable to:
   activate a do-not-disturb (DND) with respect to a first party;
   apply the DND to a first communications device associated with a first party, the DND being arranged to prevent communications from being routed to the first communications device within a communications network;
   obtain a first indication of a new attempt by the first party to establish contact with a second party, wherein the new attempt by the first party to establish contact with the second party is made using a second communications device associated with the first party, the second communications device being separate from the first communications device, and wherein the second party is aware that the first communications device and the second communications device are both associated with the first party, and wherein an association between the first communications device, the second communications device, and the first party is known to a communications manager within the communications network;
   maintain a second indication, the second indication being arranged to indicate that a first attempted communication from the second party is a response to the new attempt by the first party to establish contact with the second party;
   determine when the second party attempts to establish contact with the first party on the first communications device by making the first attempted communication; and
   route the first attempted communication from the second party to the first communications device, wherein routing the first attempted communication from the second party to the first party bypasses the DND.

6. The logic of claim 5 further operable to:
update the second indication to indicate that a second attempted communication from the second party to the first communications device is not the response to the first new attempt and is not to be routed to the first communications device, wherein the logic arranged to update the second indication is further operable to update the second indication after the first attempted communication is routed from the second party to the first communications device.

7. The logic of claim 5 wherein the new attempt by the first party is an initial call placed using the first communications device and the first indication is obtained after activating the DND.

8. The logic of claim 5 wherein the second indication is a temporary rule that is further arranged to indicate that the first attempted communication may bypass the DND.

9. An apparatus comprising:
a communications arrangement configured to receive information from a plurality of communications devices including a first communications device and a second communications device, the first communications device being associated with an address for a first party, wherein the first communications device is arranged to make a new attempt to establish contact with the second communications device and the information includes a first indication of the new attempt; and
a call manager, the call manager being configured to activate a do-not-disturb (DND) with respect to the first party and to apply the DND to the first communications device, the DND being arranged to prevent communications for the address from being routed to the first communications device, wherein the call manager is further configured to maintain a second indication which indicates that a first attempted communications from the second communications device to the address is a response to the new attempt by the first communications device to establish contact with the second communications device, to determine when the first attempted communications from the second communications device to establish contact with the first communications device, and to route the first attempted communications from the second communications device to the first communications device when the first attempted communications occurs, wherein the new attempt by the first party to establish contact with the second party is made using a third communications device associated with the first party, the third communications device being separate from the first communications device, and wherein the second party is aware that the first communications device and the third communications device are both associated with the first party, and wherein an association between the first communications device, the third communications device, and the first party is known to a communications manager within the communications network.

10. The apparatus of claim 9 wherein the call manager is further configured to update the second indication to indicate that a second attempted communications from the second communications device to the first communications device is not the response to the new attempt and is not to be routed to the first communications device, wherein the second indication is updated after the first attempted communications is routed from the second communications device to the first communications device.

11. The apparatus of claim 9 wherein the new attempt by the first party is an initial call placed using the first communications device and the first indication is obtained after the DND is activated.

12. The apparatus of claim 9 wherein the second communications device is associated with a second party, the second party further being associated with a fourth communications device, and wherein the second indication is a temporary rule that is further arranged to indicate that the first attempted communications can bypass the DND and that a second attempted communications from the fourth communications device can bypass the DND.

13. A method comprising:
processing historical communications data, the historical communications data being associated with previous communications between a first party and a second party;
temporarily automatically altering a priority level associated with a second party based on the historical communications data, wherein the priority level includes an indication of whether a first attempted call from the second party to the first party can be routed to a communications device of the first party with a first telephone number if a do-not-disturb (DND) activated with respect to the first party is applied on the communications device with respect to the first telephone number;
setting a rule associated with an ability for the second party to bypass the DND on the communications device, wherein the rule is set according to the priority level;
activating the DND with respect to the communications device;
determining if the first attempted call occurs;
determining if the rule indicates that the priority level is appropriate for the first attempted call to bypass the DND if the first attempted call occurs; and
routing the first attempted call from the second party to the communications device if it is determined that the rule indicates that the priority level is appropriate for the first attempted call to bypass the DND, wherein routing the attempted call from the second party to the first party bypasses the DND.

14. The method of claim 13 wherein temporarily automatically altering the priority level includes raising the priority level if the historical communications data indicates that the previous communications are at least one selected from the group including frequent and recent.

15. The method of claim 13 wherein the historical communications data is associated with outcomes of previous communications between the first party and the second party.

16. The method of claim 13 wherein the second party is associated with a plurality of addresses including at least a first address and a second address, and wherein setting the rule associated with the ability for the second party to bypass the DND on the communications device includes setting the rule associated with the ability for the second party to bypass the DND for a first communications initiated from the first address and to bypass the DND for a second communications initiated from the second address.

17. A method comprising:
attempting to contact a second party using a communications device, wherein attempting to contact the second party results in a first outcome;
temporarily setting a communications rule based on the first outcome, wherein if the first outcome indicates that the attempt to contact the second party was not successful, the communications rule is temporarily set using the communications device to assign the second party a relatively high priority with respect to contacting a first party; and implementing a do not disturb (DND) with respect to the first party, wherein implementing the DND with respect to the first party includes applying the DND to a communications device, wherein when the communications rule is temporarily set to assign the second party the relatively high priority with respect to contacting the first party, the communications rule is arranged to allow communications from the second party to the first party to bypass the DND when the second party attempts to contact the first party.

18. The method of claim 17 wherein attempting to contact the second party includes attempting to contact the second party at a first address, and the communications rule is arranged to allow a first communications originating at the first address to bypass the DND.

19. The method of claim 17 wherein the communications device is a telephone, and the first address is a telephone number.

20. The method of claim 17 wherein the second party has a plurality of associated addresses including at least a first address and a second address, and wherein attempting to contact the second party includes attempting to contact the second party at the first address, and the communications rule is arranged to allow a first communications originating at the first address to bypass the DND and to allow a second communications originating at the second address to bypass the DND.

* * * * *